United States Patent
Wright

(10) Patent No.: US 6,866,899 B2
(45) Date of Patent: Mar. 15, 2005

(54) POLYMERIZATION METHOD COMPRISING SEQUENTIAL IRRADIATION

(75) Inventor: Robin E. Wright, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 265 days.

(21) Appl. No.: 10/028,661

(22) Filed: Dec. 21, 2001

(65) Prior Publication Data

US 2003/0130369 A1 Jul. 10, 2003

(51) Int. Cl.$^7$ .............................. C08J 3/28; C09J 133/04; C08F 2/48
(52) U.S. Cl. ................ 427/516; 428/345; 428/355 RA; 522/4; 522/8; 522/44; 522/12; 522/120; 522/121; 522/182
(58) Field of Search ............................... 522/4, 44, 120, 522/121, 182, 8, 16, 17, 1, 2, 3, 35, 39, 42, 46, 59; 427/516, 508, 517, 519, 554, 558; 428/355 RA, 345

(56) References Cited

U.S. PATENT DOCUMENTS

| | | | |
|---|---|---|---|
| 3,615,972 A | | 10/1971 | Morehouse, Jr. et al. |
| 4,075,238 A | | 2/1978 | Mark et al. |
| 4,181,752 A | | 1/1980 | Martens et al. |
| 4,287,308 A | | 9/1981 | Nakayama et al. |
| 4,313,969 A | * | 2/1982 | Matthews et al. .......... 427/494 |
| 4,329,384 A | | 5/1982 | Vesley et al. |
| 4,330,590 A | | 5/1982 | Vesley |
| 4,379,201 A | | 4/1983 | Heilmann et al. |
| 4,415,615 A | | 11/1983 | Esmay et al. |
| 5,462,797 A | * | 10/1995 | Williams et al. ............. 428/345 |
| 5,521,227 A | * | 5/1996 | Palazzotto et al. ............. 522/4 |
| 6,040,352 A | | 3/2000 | Wright |
| 6,174,931 B1 | | 1/2001 | Moon et al. |
| 6,224,949 B1 | * | 5/2001 | Wright et al. ................ 427/508 |
| 6,299,975 B1 | * | 10/2001 | Takahira et al. ............. 428/343 |
| 6,339,111 B1 | * | 1/2002 | Moon et al. .................... 522/4 |
| 6,436,532 B1 | * | 8/2002 | Moon et al. .......... 428/355 AC |

FOREIGN PATENT DOCUMENTS

| | | |
|---|---|---|
| GB | 2 327 892 A | 2/1999 |
| JP | 63270708 | 11/1988 |
| JP | 2060981 | 3/1990 |
| JP | 5179208 | 7/1993 |
| JP | 7331198 | 12/1995 |
| WO | WO 92/15651 | 9/1992 |

OTHER PUBLICATIONS

Schaeffer et al, "The Criticality of Peak Irradiance (Light Intensity) As It Relates to Efficient UV Curing", Fusion UV Curing Systems, Mar. 1995, p. 1.*

"Extinction Coefficients of Ciba Photoinitiators", Ciba Customer Service , Jun. 1998.*

* cited by examiner

Primary Examiner—Susan Berman
(74) Attorney, Agent, or Firm—David B. Patchett

(57) ABSTRACT

A two-step method of polymerizing a composition containing a free radical photoinitiator includes the sequential steps of exposing the composition to a first radiation source having a maximum spectral output occurring at a wavelength of greater than 300 nm and, thereafter, exposing the composition to a second radiation source having a maximum spectral output occurring at a wavelength of less than 300 nm.

25 Claims, No Drawings

POLYMERIZATION METHOD COMPRISING SEQUENTIAL IRRADIATION

FIELD OF THE INVENTION

The present invention relates generally to a method of polymerizing a composition. More specifically, the present invention relates to a two step method of polymerizing a free radically polymerizable composition by sequentially exposing the composition to different wavelengths or wavelength ranges of actinic light. The invention further relates to a method for polymerizing a composition to produce viscoelastic materials, particularly acrylic-based viscoelastic materials. The present invention also relates to a method for producing pressure sensitive adhesives (PSA's) and tapes made therewith.

BACKGROUND OF THE INVENTION

Pressure sensitive adhesives (often referred to as PSA's) and methods for polymerizing compositions to produce pressure sensitive adhesives are known in the art. U.S. Pat. No. 4,181,752 (Martens et. al.), for example, discloses a one step process for preparing a normally tacky pressure sensitive adhesive by subjecting a radiation-sensitive acrylate containing polymerizable mass to radiation in the near UV region, at a fluence rate of from about 0.1 to 7 mW/cm$^2$.

U.S. Pat. No. 6,174,931 B1 (Moon et. al.) discloses a multi-stage irradiation process for producing acrylic-based compositions such as adhesives or pressure sensitive adhesive tapes. The first irradiation stage employs electromagnetic radiation at a relatively low fluence rate (i.e. 0.1 to 20 mW/cm$^2$) to effect a relatively low extent of monomer conversion, and the subsequent stage employs electromagnetic radiation at a relatively high fluence rate (i.e. greater than 20 mW/cm$^2$) to substantially complete the photopolymerization.

U.S. Pat. No. 6,040,352 discloses a method of preparing an adhesive composition that includes exposing a free-radically polymerizable composition to a monochromatic radiation source having a peak spectral output at a wavelength falling within the range of about 250 nm to about 600 nm.

Low fluence rate ultraviolet radiation, for example from about 0.1 to about 20 mW/cm$^2$, can be used to form high molecular weight acrylate polymers which are particularly useful as pressure sensitive adhesives having high performance characteristics such as, for example, high static shear strength. However, even after being exposed to radiation for long periods of time, there is typically a small amount of residual unpolymerized material left in the polymeric material that may be undesirable for some applications. A need therefore exists for improved methods for polymerizing compositions to produce pressure sensitive adhesives.

The present invention provides a method achieving a higher degree of polymerization, i.e. higher conversion, in significantly less time without sacrificing physical properties than can be achieved using previously known techniques using a single light source or combination of light sources. Surprisingly, it has been found that a second light source having most of its emissions in a wavelength ranging from between about 200 and about 280 nm is preferred in the practice of the invention even though evidence shows that such a light source by itself does not produce PSA's with high performance properties.

SUMMARY OF THE INVENTION

The present invention provides a method of polymerizing a composition containing a free radical photoinitiator, comprising the sequential steps of exposing the composition to a first radiation source having a maximum radiant power occurring at a wavelength of greater than 300 nm and, thereafter, exposing the composition to a second radiation source having a maximum radiant power occurring at a wavelength of less than 300 nm.

In one aspect, the composition is a free radically polymerizable composition. In a specific embodiment, the composition comprises about 50–100 parts by weight of at least one acrylic acid ester of an alkyl alcohol, said alcohol containing from 1 to 14 carbon atoms, about 0–50 parts by weight of at least one copolymerizable monomer, and a photoinitiator. In one embodiment, the photoinitiator comprises less than about 5 percent of the composition total weight. A suitable photoinitiator is 2,2-dimethoxy-1,2-diphenylethan-1-one. The composition may also include a combination of at least two different photoinitiators.

In another embodiment, the composition includes acrylate monomers. In a specific embodiment, the acrylate monomer comprises at least about 30% of the composition total weight. The composition may also include a crosslinking agent. Suitable crosslinking agents include a multifunctional acrylate, a triazine, benzophenone, a substituted benzophenone, or combinations thereof Preferred crosslinking agents include a multifunctional acrylate and a trihalomethyl-s-triazine.

In another aspect of the invention, the method further comprises the step of applying the composition to a substrate before exposing the composition to said first radiation source. The substrate may be paper, polymeric film, metal foil, woven cloth, or nonwoven cloth.

In another aspect, the method further comprises the step of polymerizing the composition to at least 5% conversion before the composition is applied to said substrate.

In another embodiment, the method includes the step of at least exposing the composition to said first radiation source in an inert environment wherein the concentration of oxygen is generally less than about 1000 parts per million (ppm), preferably less than 500 ppm, more preferably less than 300 ppm. In a specific embodiment, the composition is covered with a transparent film before being exposed to the first radiation source to eliminate the need for providing an inert environment. In one embodiment, the transparent film transmits at least 50% of the actinic output.

In one embodiment of the invention, exposure of the composition to the first radiation source results in at least about 20% to at least about 75% completion of the polymerization reaction, and exposure of the composition to the second radiation source results in at least about 95% completion of the polymerization reaction.

The present invention further provides a method of polymerizing a composition containing a free radical photoinitiator comprising the sequential steps of exposing the composition to a first radiation source comprising wavelengths ranging from about 280 nm to 500 nm, and thereafter exposing the composition to a second radiation source comprising wavelengths ranging from about 200 nm to 280 nm. In a specific embodiment, at least 90% of the actinic output from the first radiation source falls within a wavelength range from 315 nm to 400 nm, and at least 90% of the actinic output from said second radiation source falls within a wavelength range from 200 nm to 280 nm.

The present invention also provides a method of polymerizing a composition containing a free radical photoinitiator comprising the sequential steps of exposing the composition to a first radiation source, said first radiation source comprising at least one of an incandescent lamp and a fluorescent lamp, and thereafter exposing the composition to a second radiation source, said second radiation source comprising at least one of a low pressure mercury arc lamp, an excimer lamp, and an excimer laser. In a specific embodiment, the fluence rate of the first radiation step is less than about 50 milliwatts/square centimeter (mW/cm$^2$), and the fluence rate of the second radiation step is greater than 2 mW/cm$^2$.

The expression "actinic output" refers to spectral wavelengths able to cause a photochemical change.

DETAILED DESCRIPTION

The method of the present invention comprises a two-step irradiation process to polymerize, or to polymerize and crosslink, free radically polymerizable compositions including at least one photoinitiator and free radically polymerizable material. Generally, the wavelengths of the actinic radiation used in the first step are greater than the wavelengths of the actinic radiation used in the second step. The wavelengths of the actinic radiation in the first step are generally greater than about 300 nm and the wavelengths of the actinic radiation in the second step are generally less than about 300. Due to the nature of most radiation sources, however, there may by some overlap between the wavelengths of the actinic radiation in the first and second steps.

More specifically, the first step is conducted using actinic radiation from a first light source having a majority of its emissions in a first wavelength range that includes wavelengths where the photoinitiator absorbs, and at least one second sequential step that is conducted using actinic radiation from a second light source having a majority of its emissions in a different wavelength range that includes wavelengths where the photoinitiator has a second absorption greater than the first. By a majority of its emissions, it is meant that over 50% of the emissions of the light source are within the specified wavelength range. As indicated above, the first wavelength range generally includes actinic radiation having longer wavelengths than the second wavelength range, but due to the means currently available to generate actinic radiation, there will typically be some overlap between the wavelengths of the first and second steps. The spectral overlap of the two light sources is generally less than about 20%, preferably, less than about 15%, and more preferably, less than about 10%. Preferably, over 80% of the emissions are within the specified wavelength range, and more preferably, over 90% of the emissions are within the specified wavelength range. In addition, the first irradiation step is preferably conducted using low intensity actinic radiation, i.e. having a fluence rate of less than about 20 mW/cm$^2$.

In practice, the composition including a free radical photoinitiator is exposed to the first light source to effect a conversion of at least about 10% and is subsequently exposed to the second light source. The composition may be, for example, monomeric, oligomeric, a monomer syrup, or any combination thereof. Preferably, the composition is polymerized to form a viscoelastic polymer. More preferably, an acrylate viscoelastic polymer is formed. Acrylate viscoelastic polymers are suitable for various uses such as pressure sensitive adhesives, vibration dampers, and hot melt adhesives. While the invention applies to other materials, including non-viscoelastic polymers, the invention will be exemplified as a pressure sensitive adhesive for convenience.

Suitable light sources are those that are able to excite at least one photoinitiator present to generate free radicals and initiate the polymerization process. Suitable sources include low intensity sources in which a phosphor coating is used to absorb the direct emission energy and re-radiate it at longer wavelengths. The emission from these lamps is typically spread over a broad wavelength range, hence their classification as broadband sources. The most suitable types of lamps depend upon the photoinitiator(s) that are present. It is desirable to select lamps that emit radiation at wavelengths needed to activate the photoinitiator in such a way as to obtain the desired properties.

In a preferred practice of the invention, the first light source is one that has the majority of its lying between about 280 to about 500 nm, preferably between about 300 to about 500 nm, more preferably between about 315 to about 440 nm, and most preferably between about 315 to about 400 nm. The first step irradiation is preferably at a low fluence rate, i.e., less than about 50 mW/cm$^2$, more preferably less than about 20 mW/cm$^2$, and most preferably less than about 10 mW/cm$^2$. Examples of suitable first light sources are incandescent lamps and fluorescent lamps.

The maximum spectral output of the first light source generally occurs at a wavelength greater than about 300 nm, preferably greater than about 310 nm, and most preferably greater than about 320 nm.

The second light source is one that has the majority of its spectral output lying between about 200 to 280 nm, preferably from about 220 to 270 nm, and more preferably from about 240 to 260 nm. In a more preferred practice of the invention, at least 80% of the emissions fall within the above ranges, and most preferred at least 90% of the emissions fall within the above ranges. The maximum spectral output of the second light source generally occurs at a wavelength less than about 300 nm, preferably less than about 280 nm, and most preferably less than about 260 nm. Suitable sources for the second step irradiation include low pressure mercury arc lamps, excimer lamps, and excimer lasers. A preferred second light source is a low-pressure mercury arc lamp, especially a germicidal lamp where essentially all of the lamp output occurs in a narrow band centered at about 254 nm. These lamps operate at low temperature allowing their use with heat sensitive coatings and backings. Such lamps are well known industrially for their efficacy in the purification of air and water.

Fluence rates useful in the second step of the invention can be high (greater than 20 mW/cm$^2$) or low (less than 20 mW/cm$^2$). In a preferred practice of the invention, the fluence rate of the second step is at least 2 mW/cm$^2$, more preferably at least 10 mW/cm$^2$, and most preferably at least 20 mW/cm$^2$. In some cases, it may be advantageous to provide multiple lamps to achieve an optimal effect. Alternatively, a combination of sources with output below 280 nm may be utilized. During the second step irradiation, the polymerization reaction is at least substantially completed, i.e. preferably at least 95, more preferably 97, and most preferably 99 weight % monomer conversion has been achieved as well as any crosslinking, thereby substantially completing the formation of the acrylate polymer or copolymer.

Each step of irradiation can further include zones of varying fluence rates within the ranges of fluence rates specified. For example, the first step may include several zones, each having a different fluence rate within the 280 to 500 nm wavelength range. Likewise, the second step may include several zones having a different fluence rate within the 200 to 280 nm wavelength range.

The photopolymerizable composition may be coated onto a substrate to which it may be temporarily or permanently adhered and exposed to radiation in the method of the invention, or the composition may be polymerized in a container such as, for example, a tube or a pouch, or in a reactor such as a stirred tube reactor or other reaction vessel. Suitable substrates include articles of manufacture as well as pressure sensitive adhesive tape backings. Permanent tape backings include paper, polymeric films, metal foils, woven and nonwoven cloths, and combinations thereof. The tape backings may be primed to improve the adhesion of the compositions to them, and may also be treated on the backside with a release coating. Temporary substrates are those that are removed during use of the polymerized composition such as in liners for pressure sensitive adhesive double-coated tapes and transfer tapes. Suitable substrates include papers, films, and the like. Temporary substrates may also be treated with a release coating to facilitate removal of the adhesive from the film.

In a preferred practice of the invention, the composition is coated onto a paper backing to form a coated web and the first, and optionally the second, irradiation step is conducted in an inert environment where the amount of oxygen is controlled, e.g., less than about 1000 ppm of oxygen, preferably less than about 500 ppm, and more preferably less than about 300 ppm. Creating an inert environment can be achieved by blanketing the coating in an atmosphere of nitrogen, carbon dioxide, helium, argon, and the like. It may also be done by covering the composition with a barrier film that is sufficiently transparent to UV radiation to effect the desired polymerization. When a film such as a polymeric film is used to exclude oxygen from the composition, the transmittance of the film, i.e. the transmission of actinic radiation through the film and any optional coatings on the surface of the film, is preferably greater than about 70%.

Typically, shorter wavelengths are more sensitive to film transmission because of the inherent absorption of shorter wavelengths by certain types of film. Suitably transparent films for the second irradiation step include polyolefin films such as biaxially oriented polypropylene (BOPP), polyethylene, and fluorinated polyolefin films such as FEP 100A, FEP 200A, Tefzel films (E. I. Dupont de Nemours, Wilmington, Del.) and THV 200, THV 300, and THV 400 (3M Dyneon, St. Paul, Minn.). The latter are especially advantageous when the film is to be reused or used for extended periods of exposure. Alternatively, when a less transmissive film such as polyethylene terephthalate is used, it must be removed during the second irradiation step to allow the radiation to impinge directly upon the coating. The films are optionally treated with a release material to facilitate removal of the film from the polymerized composition. Such release materials are generally known and include materials such as silicones, fluorocarbons, and polyolefins.

In some instances it is desirable to cool the composition during one or both irradiation steps. This can be accomplished on a coated web by pulling the coated film over a cooling plate, by blowing cooled nitrogen onto the web, or by blowing air onto the aforementioned sandwich constructions. Containers can be cooled by, for example, immersing the container in water, using a cooling jacket around the container, or by blowing cooled air or nitrogen on the container.

Photoinitiators suitable for the invention are selected to absorb sufficient light energy at the wavelengths needed to effect polymerization. The photoinitiator can be a single photoinitiator that absorbs at both the first and second step wavelength ranges, or it may be a combination of two different photoinitiators. Preferably, a single photoinitiator is used that absorbs at both the first and second step wavelength ranges of the lamps. Especially preferred are photoinitiators that have low molar absorption coefficients in the 280 to 600 nm wavelength range and higher molar absorption coefficients in the 200 nm to 280 nm range.

Photoinitiators useful in the present invention include benzoin ethers, substituted benzoin ethers such as benzoin methyl ether or benzoin isopropyl ether, substituted acetophenones such as 2,2-dimethoxy-1,2-diphenylethan-1-one; 2,2,-diethoxy-acetophenone and 2,2-dimethyl-acetophenone; substituted alpha-ketols such as 2-methyl-2-hydroxy propiophenone; aromatic sulphonyl chlorides such as 2-naphthalene sulphonyl chloride; photoactive oximes such as 1-phenyl-1,2-propanedione-2-(O-ethoxycarbonyl) oxime; substituted triazines; and oligomeric photoinitiators such as oligomeric 2-hydroxy-2-methyl-1-[4-methylvinyl) phenyl]-1-propanone (available as Esacure KIP 150 from Sartomer, Exton, Pa.), and mixtures thereof.

Preferred photoinitiators include 2,2-dimethoxy-1,2-diphenylethan-1-one (available from Ciba Additives as Irgacure 651 and from Sartomer, Exton, Pa. as Esacure KB-1), Irgacure 184 (Ciba), Darocur 2959 (Ciba), and Darocur 1173 (Ciba).

Preferably, the photoinitiator is present in an amount from about 0.01 part to about 5 parts and, most preferably, from about 0.1 part to about 2 parts by weight, based upon 100 total parts by weight of monomer or monomer/oligomer blend.

In a preferred embodiment, the photopolymerizable compositions comprise at least one acrylic acid ester, i.e. acrylate, of an alkyl alcohol, preferably a non-tertiary alcohol, containing from 1 to 18, preferably 4 to 14, carbon atoms. Included within this class of monomers are, for example, isooctyl acrylate, isononyl acrylate, 2-ethylhexyl acrylate, decyl acrylate, dodecyl acrylate, octadecyl acrylate, n-butyl acrylate, methyl acrylate, and hexyl acrylate. Preferred monomers include isooctyl acrylate, isononyl acrylate, butyl acrylate, and 2-ethylhexyl acrylate.

Preferably, the acrylate is co-polymerized with a reinforcing monomer that has a higher homopolymer glass transition temperature than that of the homopolymer of the acrylate. Suitable copolymerizable monomers are typically ethylenically unsaturated monomers such as, for example, acrylic acid, methacrylic acid, acrylamide, acrylonitrile, methacrylonitrile, N-substituted acrylamides, hydroxy acrylates, N-vinyl caprolactam, N-vinyl pyrrolidone, maleic anhydride, isobornyl acrylate, and itaconic acid.

The acrylate is typically present in amounts of from about 30 to 100 parts of the total monomer composition and the reinforcing monomer is present in amounts of from about 0 to 70 parts of the total monomer composition. The choice of monomers and amounts can be selected to achieve the properties desired for the end use. The selection of types and amounts of monomers and their resulting properties in an adhesive are generally known by those skilled in the art.

If the composition is to be coated onto a substrate before irradiation, it may be preferable to increase the viscosity of the monomer or monomer mixture to form a "syrup" that can be handled more conveniently during the coating process. The term syrup refers to a composition that has been thickened to a coatable viscosity. A preferred method to increase the viscosity of the composition to a more desirable level is to partially polymerize the monomer mixture with a small amount of a suitable initiator by exposure to actinic radiation (such as UV light) or by thermal polymerization. Other methods of increasing the viscosity of the monomer mixture include adding viscosity modifying agents such as high molecular weight polymers or thixotropic agents such as colloidal silicas, etc.

The partially polymerized monomeric mixture or syrup is photopolymerized in the first step by irradiating the same with radiation of about 280 to 500 nm wavelength and 0.01 to 20 mW/cm² fluence rate to effect about 10% conversion of the monomeric mixture or prepolymerized syrup to acrylate copolymer. Preferably, the monomer conversion is at least 20%, more preferably at least 55%, and most preferably at least 75% after the first step irradiation. The polymerization is completed to at least 95% conversion in the second step by irradiating the composition with radiation of about 200 to 280 nm wavelength. Preferably, the final conversion is greater than about 97% and more preferably greater than 99%.

The photopolymerizable composition may contain a crosslinking agent to enhance the cohesive strength of the resulting adhesive or article. Suitable crosslinking agents include hydrogen-abstracting carbonyls such as anthraquinone and benzophenone and their derivatives as disclosed in U.S. Pat. No. 4,181,752, and polyfunctional acrylates such as 1,6-hexanediol diacrylate, trimethylolpropane triacrylate, and 1,2-ethyleneglycol diacrylate, as well as those disclosed in U.S. Pat. No. 4,379,201. Other useful crosslinkers monomers include polymeric multifunctional (meth)acrylates, e.g., poly(ethylene oxide) diacrylate or poly(ethylene oxide) dimethacrylate; polyvinylic crosslinking agents such as substituted and unsubstituted divinylbenzene; and difunctional urethane acrylates such as "EBECRYL" 270 and "EBECRYL" 230 (1500 weight average molecular weight and 5000 weight average molecular weight acrylated urethanes, respectively—both available from UCB of Smyrna,. Ga.), and combinations thereof. Useful crosslinking agents that also function as photoinitiators are the chromophore-substituted halomethyl-s-triazines disclosed in U.S. Pat. Nos. 4,330,590 and 4,329,384.

Where a foam-like material or foam PSA tape is desirable, a monomer blend comprising microbubbles may be used. The microbubbles may be glass or they may be polymeric such as those described in U.S. Pat. Nos. 3,615,972, 4,075,238, and 4,287,308. Suitable microbubbles have an average diameter of from about 10 to about 200 micrometers and comprise from about 5 to about 65 volume percent of the pressure sensitive adhesive layer. Preferred glass microbubbles have average diameters of about 50 micrometers.

The process of the invention can be used to make cellular PSA membranes as discussed in U.S. Pat. No. 4,415,615.

Typical thicknesses of PSA's made according to the invention can range from about 1 to about 500 micrometers, more preferably, from about 1 to about 250 micrometers, most preferably from about 1 to about 100 micrometers. When thicker coatings are desirable, it may be advantageous to irradiate from both sides simultaneously.

Other materials that can be blended with the polymerizable mixture include fillers, tackifiers, foaming agents, antioxidants, plasticizers, reinforcing agents, hydrophobic silica, dyes, pigments, fibers, fire retardants, and viscosity adjusting agents.

In order that the invention described herein can be more fully understood, the following examples are set forth. It should be understood that these examples are for illustrative purposes only, and are not to be construed as limiting this invention in any manner.

Test Methods
Percent Conversion (% Conversion)

The amount of volatile material present in a coating was determined by die-cutting a sample having an area of 14.5 cm² from the coated web after irradiating, placing the sample with backing, coated side up, in a preweighed aluminum pan ($W_{pan}$), weighing ($W1_{sample\ plus\ pan}$), drying for 2 hours at 110° C., and then reweighing ($W2_{sample\ plus\ pan}$). The uncoated backing weight ($W_{backing}$) was obtained by taking the numerical average of 10 die-cut samples. The percent volatiles (V) was obtained using the following equation:

$$V=(W1_{sample\ plus\ pan}-W2_{sample\ plus\ pan})/(W1_{sample\ plus\ pan}-W_{pan}-W_{backing})*100$$

The percent conversion was calculated using the following equation:

$$\%\ Conversion=100\%-V$$

A very small amount of the volatiles may have been water, which was considered negligible for this calculation.

Static Shear Strength

Test panels and test strips made of bright, annealed stainless steel were cleaned by wiping with a tissue soaked in methyl ethyl ketone, then with a tissue soaked in a 50/50 mixture of isopropanol/distilled water, and finally an additional three wipes with a tissue soaked in acetone. A pressure sensitive adhesive on a release liner was laminated to a stainless steel test strip measuring 12.7 mm by 50.8 mm by 1.6 mm using thumb pressure to ensure sufficient lamination. The liner was removed and the strip was laminated to a stainless steel panel (which was wider than the test strip) so that the overlap between the panel and the strip was 25.4 mm. A 1000-gram weight was placed over the laminate and allowed to dwell for about 15 minutes at ambient temperature (approximately 23° C.) before the panel was hung at 2° from the vertical (to ensure a shear failure mode) with the free end of the strip hanging down. A 1000-gram weight was hung from the free end of the test strip and a timer started. The shear strength is indicated by the amount of time that the test strip remains adhered to the panel. Values reported are in units of minutes and are the average of three independent samples.

EXAMPLES 1–15 AND REFERENCE EXAMPLES R1–R4

A pressure sensitive adhesive composition was prepared by mixing 90 parts of isooctyl acrylate, 10 parts of acrylic acid, and 0.04 part of a photoinitiator (2,2-dimethoxy-1,2-diphenylethan-1-one available as Irgacure™ 651 from Ciba Additives). The composition was degassed using a bubbling nitrogen gas stream for several minutes. The composition was then exposed to 2, 4, 6, 8, or 10 40-watt fluorescent black lights (350BL available from Osram Sylvania), depending on the example, to provide a syrup having a Brookfield viscosity of about 1500 centipoise. Another 0.1 part of photoinitiator (2,2-dimethoxy-1,2-diphenylethan-1-one) was then dissolved in the syrup.

Each example was knife coated to a thickness of about 2.0 mils (50.8 micrometers) onto the release side of a 50.8 micrometer thick polyester film supplied with a silicone coating on one side then conveyed on a carrier belt and irradiated in a nitrogen inserted atmosphere under the exposure conditions shown in Table 2 to form a pressure sensitive adhesive.

The fluences or total energies for the various lamp combinations were measured at 15 cm/min using a PowerMap™ radiometer equipped with a low intensity sensing head (available from EIT Inc., Sterling, Va.). The data, shown in Table 1, include calculated fluences at higher speeds based on the speed ratios.

TABLE 1

| No. & Type of Lamps | Fluence - milliJoules/square centimeter | | | |
|---|---|---|---|---|
| | 15 cm/min | 30 cm/min | 61 cm/min | 122 cm/min |
| UVA-2 | 280 | 140 | 70 | 35 |
| UVA-4 | 595 | 297 | 149 | 74 |
| UVA-6 | 966 | 483 | 241 | 121 |
| UVA-8 | 1329 | 664 | 332 | 166 |
| UVA-10 | 1677 | 838 | 419 | 210 |
| UVC-2 | 347 | 174 | 87 | 43 |
| UVC-10 | 1356 | 678 | 339 | 170 |

*320–390 nm for UVA
250–260 nm for UVC

The first step exposure zone consisted of zero to ten 3.8 cm diameter 350BL lamps, described above. Each lamp was placed across the carrier belt at a center-to-center spacing of 5 cm. These bulbs are referred to as UVA bulbs because their output occurs primarily between about 320 and 390 nm with a peak emission at around 350 nm in what is referred to as the UVA spectral region.

The second exposure zone consisted of zero to ten 1.6 cm diameter 20-watt germicidal bulbs (available from Voltarc, Waterbury, Conn.), each placed across the carrier belt at about a 2.5 cm center-to-center spacing. These bulbs have near monochromatic emission between 250 and 260 nm and are referred to as UVC bulbs since their output is primarily in the UVC spectral region.

Reference Examples (R1-R4) were polymerized using only the UVC bulbs while the Examples of the present invention used a sequential combination of UVA and UVC bulbs at various line speeds from 0.5, 1.0, 2.0, and 4 feet per minute (15, 30, 61, and 122 centimeters/minutes (cm/min), respectively). Although not identified separately, the samples under the columns marked "After UVA" show the residual and shear strength of the adhesive after exposure to only UVA radiation.

The line speeds and number of each type of lamp are shown in Table 2 along with the Residuals and the Static Shear Strength of the adhesive composition after exposure to only UVA bulbs, only UVC bulbs, or, in accordance with the method of the present invention, to a combination including both UVA and UVC bulbs. In Examples 1–15, 'After UVC' refers to samples exposed to UVC radiation in line and immediately after exposure to UVA radiation. The corresponding 'After UVA' data refer to samples only exposed to UVA radiation. The latter, in effect, are additional comparatives.

TABLE 2

| | Speed | No. of Lamps | | % Conversion | | Static Shear-Minutes | |
|---|---|---|---|---|---|---|---|
| Ex | cm/min | UVA | UVC | After UVA | After UVC | After UVA | After UVC |
| 1 | 15 | 2 | 2 | 93.3 | 98.6 | 1.5 | 1.3 |
| 2 | 15 | 4 | 2 | 97.7 | 98.9 | 5.7 | 4.3 |
| 3 | 15 | 6 | 2 | 98.1 | 99.0 | 9.0 | 11.0 |
| 4 | 15 | 8 | 2 | 97.3 | 99.5 | 6.33 | 13.3 |
| 5 | 15 | 10 | 2 | 97.9 | 99.4 | 32.0 | 109.7 |
| 6 | 61 | 2 | 2 | 43.4 | 95.2 | 0.03 | 8.0 |
| 7 | 61 | 4 | 2 | 74.4 | 97.3 | 0.23 | 49.7 |
| 8 | 61 | 6 | 2 | 86.8 | 97.7 | 5.7 | 46.0 |
| 9 | 61 | 8 | 2 | 90.5 | 98.2 | 13.0 | 181 |
| 10 | 61 | 10 | 2 | 94.3 | 98.2 | 34.3 | 333 |
| 11 | 122 | 2 | 10 | 24.9 | 95.2 | <0.1 | 8.0 |
| 12 | 122 | 4 | 10 | 43.1 | 95.2 | <0.1 | 20.7 |
| 13 | 122 | 6 | 10 | 54.7 | 96.2 | 0.1 | 51.7 |
| 14 | 122 | 8 | 10 | 69.9 | 97.0 | 0.8 | 90.3 |
| 15 | 122 | 10 | 10 | 81.1 | 97.6 | 8.7 | 849 |
| R1 | 15 | 0 | 2 | 0 | 83.4 | NA | 0.2 |
| R2 | 15 | 0 | 10 | 0 | 99.1 | NA | 2.0 |
| R3 | 61 | 0 | 2 | 0 | 93.9 | NA | 1.0 |
| R4 | 122 | 0 | 10 | 0 | 93.2 | NA | 3.0 |

The data in Table 2 show that pressure sensitive adhesives made using the process of the present invention exhibit improved shear strength over UVA lamps alone or UVC lamps alone even when the % conversion may be higher as in Reference Example 2.

EXAMPLES 16–40 AND REFERENCE EXAMPLES R5–R9

Pressure sensitive adhesives were prepared according to the procedure of Example 1–15 except that after the syrup was prepared, 0.1 part 1,6-hexanediol diacrylate was also added as a crosslinking agent before coating.

TABLE 3

| Ex | Speed cm/min | No. of Lamps UVA | No. of Lamps UVC | % Conversion After UVA | % Conversion After UVC | Static Shear-Minutes After UVA | Static Shear-Minutes After UVC |
|---|---|---|---|---|---|---|---|
| 16 | 30 | 2 | 2 | 81.9 | 97.5 | 7.7 | 14.3* |
| 17 | 30 | 4 | 2 | 92.0 | 98.3 | 13.0 | 13.7* |
| 18 | 30 | 6 | 2 | 95.8 | 98.1 | 32.7 | 32.0* |
| 19 | 30 | 8 | 2 | 97.4 | 98.1 | 176.3 | 28.0* |
| 20 | 30 | 10 | 2 | 98.1 | 98.8 | 147.0 | 388* |
| 21 | 61 | 2 | 2 | 40.1 | 96.0 | 0.1 | 29.7* |
| 22 | 61 | 4 | 2 | 69.5 | 96.6 | 4.0 | 26.7* |
| 23 | 61 | 6 | 2 | 84.9 | 97.9 | 70.0 | 5393* |
| 24 | 61 | 8 | 2 | 91.9 | 96.9 | 127.0 | 738* |
| 25 | 61 | 10 | 2 | 95.6 | 98.1 | 841.7 | 6248* |
| 26 | 30 | 2 | 10 | 81.9 | 97.8 | 7.7 | 10.7* |
| 27 | 30 | 4 | 10 | 92.0 | 99.3 | 13.0 | 14.3* |
| 28 | 30 | 6 | 10 | 95.8 | 99.0 | 32.7 | 17.7* |
| 29 | 30 | 8 | 10 | 97.4 | 99.2 | 176.3 | 161* |
| 30 | 30 | 10 | 10 | 98.1 | 99.2 | 147.0 | 598* |
| 31 | 61 | 2 | 10 | 40.1 | 97.8 | 0.1 | 109* |
| 32 | 61 | 4 | 10 | 69.5 | 98.4 | 4.0 | 23.7* |
| 33 | 61 | 6 | 10 | 84.9 | 98.5 | 70.0 | 107* |
| 34 | 61 | 8 | 10 | 91.9 | 98.6 | 127 | 10000* |
| 35 | 61 | 10 | 10 | 95.6 | 98.9 | 841.7 | 6800* |
| 36 | 122 | 2 | 10 | 25.7 | 95.7 | 0.1 | 283 |
| 37 | 122 | 4 | 10 | 48.7 | 94.0 | 0.1 | 88.7 |
| 38 | 122 | 6 | 10 | 54.8 | 96.0 | 0.6 | 71.0 |
| 39 | 122 | 8 | 10 | 69.7 | 96.6 | 3.7 | 528 |
| 40 | 122 | 10 | 10 | 78.4 | 97.0 | 17.3 | 2568 |
| R5 | 30 | 0 | 2 | 0 | 97.2 | NA | 23.0 |
| R6 | 61 | 0 | 2 | 0 | 95.5 | NA | 22.0 |
| R7 | 30 | 0 | 10 | 0 | 98.6 | NA | 11.7 |
| R8 | 61 | 0 | 10 | 0 | 96.6 | NA | 18.7 |
| R9 | 122 | 0 | 10 | 0 | 92.3 | NA | 38.3 |

*Some of the samples exhibited adhesive failure mode

The data in Table 3 show the advantage of sequentially exposing the composition to UVA radiation and then to UVC radiation in achieving higher shear strengths than exposure to either UVA or UVC radiation alone.

Reasonable modifications and variations are possible from the foregoing disclosure without departing from either the spirit or the scope of the present invention as defined by the claims.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A method of polymerizing a composition consisting essentially of a free radically polymerizable composition containing a free radical photoinitiator to produce a pressure-sensitive adhesive, comprising the sequential steps of:

(a) exposing the composition to a first radiation source having a maximum spectral output occurring at a wavelength of greater than 300 nm; and
    (b) thereafter exposing the composition to a second radiation source having a maximum spectral output occurring at a wavelength of less than 300 nm.

2. A method as defined in claim 1, wherein said composition consists essentially of:

(a) a free radical photoinitiator;
    (b) about 50–100 parts by weight of at least one acrylic acid ester of an alkyl alcohol, said alcohol containing from 1 to 18 carbon atoms; and
    (c) about 0–50 parts by weight of at least one copolymerizable monomer.

3. A method as defined in claim 1, further comprising the step of applying the composition to a substrate before exposing the composition to said first radiation source.

4. A method as defined in claim 3, wherein said substrate comprises at least one of paper, polymeric film, metal foil, woven cloth, or nonwoven cloth.

5. A method as defined in claim 3, further comprising the step of polymerizing the composition to at least 10% conversion before the composition is applied to said substrate.

6. A method as defined in claim 1, wherein the step of at least exposing the composition to said first radiation source is conducted in an inert environment wherein the concentration of oxygen is less than about 1000 ppm.

7. A method as defined in claim 6, wherein the composition is covered by a transparent film before being exposed to said first radiation source to create said inert environment.

8. A method as defined in claim 1, wherein said photoinitiator comprises less than about 5 percent of the composition total weight.

9. A method as defined in claim 1, wherein the photoinitiator comprises 2,2-dimethoxy-1,2-diphenylethan-1-one.

10. A method as defined in claim 1, wherein the composition includes a combination of at least two different photoinitiators.

11. A method as defined in claim 1, wherein exposure of the composition to said first radiation source results in at least about 20% completion of the polymerization reaction, and exposure of the composition to said second radiation source results in at least about 95% completion of the polymerization reaction.

12. A method as defined in claim 1, wherein exposure of the composition to said first radiation source results in at least about 75% completion of the polymerization reaction, and exposure of the composition to said second radiation source results in greater than about 95% completion of the polymerization reaction.

13. A method as defined in claim 1, wherein the composition includes acrylate monomers.

14. A method as defined in claim 13, wherein said acrylate monomer comprises at least about 30% of the composition total weight.

15. A method as defined in claim 1, wherein the composition includes a crosslinking agent.

16. A method as defined in claim 15, wherein the crosslinking agent is a triazine, benzophenone, or a substituted benzophenone.

17. A method as defined in claim 15, wherein the crosslinking agent is a trihalomethyl-s-triazine.

18. A tape including a pressure sensitive adhesive prepared using the method of claim 1.

19. A method of polymerizing a composition consisting essentially of a free radically polymerizable composition, comprising the sequential steps of:
(a) exposing the composition to a first radiation source comprising a fluorescent lamp; and
(b) thereafter exposing the composition to a second radiation source comprising a germicidal lamp.

20. The method as defined in claim 1, wherein the fluence rate of the first and second radiation steps is less than 20 mW/cm$^2$.

21. A method as defined in claim 1, wherein said second radiation source is a low pressure mercury lamp.

22. A method as defined in claim 21, wherein said low pressure mercury lamp is a germicidal lamp.

23. A method of polymerizing a composition to produce a pressure-sensitive adhesive, comprising the sequential steps of:
(a) providing a composition consisting essentially of a free radically polymerizable composition;
(a) exposing the composition to a first radiation source having a maximum spectral output occurring at a wavelength ranging from about 315 nm to 500 nm; and
(b) thereafter exposing the composition to a second radiation source having a maximum spectral output occurring at a wavelength ranging from about 200 nm to 300 nm.

24. The method as defined in claim 23, wherein at least 90% of the actinic output from said first radiation source falls within a wavelength range from 315 nm to 400 nm.

25. The method as defined in claim 23, wherein at least 90% of the actinic output from said second radiation source falls within a wavelength range from 200 nm to 300 nm.

* * * * *